(12) United States Patent
Boillot (10) Patent No.: US 7,620,316 B2
(45) Date of Patent: Nov. 17, 2009

(54) METHOD AND DEVICE FOR TOUCHLESS CONTROL OF A CAMERA

(75) Inventor: Marc Andre Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 438 days.

(21) Appl. No.: 11/562,408

(22) Filed: Nov. 21, 2006

(65) Prior Publication Data

US 2007/0120996 A1 May 31, 2007

Related U.S. Application Data

(60) Provisional application No. 60/740,213, filed on Nov. 28, 2005.

(51) Int. Cl.
*G03B 17/48* (2006.01)
*G03B 29/00* (2006.01)
*G09G 5/00* (2006.01)

(52) U.S. Cl. ........................... 396/429; 345/156

(58) Field of Classification Search ............... 396/419, 396/428, 429; 348/207.1, 207.11, 211.8, 348/211.9; 345/156, 157, 158
See application file for complete search history.

(56) References Cited

U.S. PATENT DOCUMENTS

| | | | |
|---|---|---|---|
| 5,059,959 A * | 10/1991 | Barry | ............... 345/168 |
| 5,274,363 A | 12/1993 | Koved | |
| 6,130,663 A | 10/2000 | Null | |
| 6,137,427 A | 10/2000 | Binstead | |
| 6,313,825 B1 | 11/2001 | Gilbert | |
| 6,937,227 B2 | 8/2005 | Qamhiyah | |
| 6,943,774 B2 * | 9/2005 | Horiki | ............... 345/158 |
| 7,071,968 B2 * | 7/2006 | Novak | ............... 348/207.1 |
| 7,078,911 B2 | 7/2006 | Cehelnik | |
| 7,081,884 B2 | 7/2006 | Kong | |
| 7,092,109 B2 | 8/2006 | Satoh | |
| 7,130,754 B2 | 10/2006 | Satoh | |
| 2002/0000977 A1 * | 1/2002 | Vranish | ............... 345/173 |
| 2004/0046795 A1 * | 3/2004 | Josephson et al. | ........... 345/764 |
| 2006/0161871 A1 | 7/2006 | Hotelling | |
| 2006/0256090 A1 | 11/2006 | Huppi | |
| 2006/0279528 A1 * | 12/2006 | Schobben et al. | ........... 345/156 |
| 2008/0266271 A1 * | 10/2008 | Van Berkel et al. | ......... 345/174 |

* cited by examiner

*Primary Examiner*—Kenneth J Whittington
(74) *Attorney, Agent, or Firm*—Marc Boillot (57) ABSTRACT

A device (100) and a method (200) for operating a camera (130) based on touchless movements is provided. The device (100) includes a sensing unit (110) for detecting a touchless movement, and a controller (130) for handling one or more controls of the camera in accordance with the touchless movement. A virtual user interface is provided to allow a user to control a camera on a computer or a mobile device using touchless finger movements. Touchless controls are provided for zoom, pan, focus, aperture, balance, color, calibration, or tilt. A first touchless finger movement can select a control, and a second touchless finger movement can adjust the control.

20 Claims, 6 Drawing Sheets

METHOD AND DEVICE FOR TOUCHLESS CONTROL OF A CAMERA

CROSS-REFERENCE TO RELATED APPLICATIONS

This application claims the priority benefit of U.S. Provisional Patent Application No. 60/740,213 entitled "Method and System for Controlling a Camera" filed Nov. 28, 2005, the entire contents of which are hereby incorporated by reference. This application also incorporates by reference the following Utility Applications: U.S. patent application Ser. No. 11/559,295, entitled "Method and System for Directing a Control Action", filed on Nov. 13, 2006, U.S. patent application Ser. No. 11/559,325, entitled "Method and System for Touchless User Interface Control", filed on Nov. 13, 2006; and U.S. patent application Ser. No. 11/562,404, entitled "Method and System for Object Control", filed on Nov. 21, 2006.

BACKGROUND

1. Field

The present invention generally relates to the field of motion sensing, more particularly to user interfaces.

2. Introduction

Demand for internet has grown rapidly with the communication service providers and component manufacturers producing higher speed and higher capacity equipment to support the demand. Users are logging on to the internet using computers and mobile communication devices. Services such as email, conferencing, file sharing, messaging, and multimedia applications are incorporating high quality voice and video with their products. Computers and mobile communication devices can also include cameras for taking pictures and taking recordings. Many people use computers and mobile devices for voice and video communication. The computers and mobile devices can include a camera as a peripheral component of their system to enhance voice and visual communication.

Cameras can be mounted on computer monitors for capturing images of the person at the computer and for sharing pictures with others over the internet. Web cameras allow people to see the person with whom they are interfacing, which allows for a more satisfying and enjoyable visual experience. The person using the computer generally determines where to position and/or focus the view of the camera which is usually done manually. Cameras can also be included on mobile devices for capturing a picture of a user or allowing the user to take a picture. A user can take a picture using a mobile device and send the picture over a communication channel.

SUMMARY

Broadly stated, embodiments of the invention are directed to a method and device for touchless control of a camera. One embodiment is directed to a sensing unit for detecting a touchless movement, and a controller for controlling a camera as a function of the touchless movement. The device can be a mobile phone, a portable music player, a security device, a laptop, or a video recorder. The controller can adjust a zoom, pan, focus, aperture, balance, color, calibration, or tilt of the camera in accordance with the touchless movement. In one arrangement, the sensing unit can identify a touchless movement of an object that is not in a field of view of the camera. For example, the controller can track a finger that is outside a view of the camera and point a view of the camera in a direction of the finger movement. As another example, the sensing unit can create a touchless sensing field above a keyboard typing area, such that a finger moving in the touchless sensing field controls a web camera. In another arrangement, the sensing unit can identify a touchless movement of an object that is in a field of view of the camera. For example, the controller can focus the camera on an object that moves in the view of the camera. The sensing device can include an ultrasonic device, an optical device, an infrared device, a laser device, or a charge coupled device (CCD).

One embodiment is directed to a method for operating a camera using touchless control. The method can include detecting a touchless movement, and controlling the camera in accordance with the touchless movement. The method can include identifying an absolute location of an object producing the touchless movement, and adjusting a control of the camera in accordance with the absolute location. The method can also include identifying a relative displacement of an object producing the touchless movement, and adjusting a control of the camera in accordance with the relative displacement. As an example, the object can be a finger for controlling the camera through touchless control. A touchless control can be a zoom, pan, focus, aperture, balance, color, calibration, or tilt. The touchless control can be adjusted in accordance with a range of the touchless movement.

The touchless movement can be a continuous movement, an accelerated movement, a graduated movement, or a stop movement. A control can be adjusted in accordance with the type of touchless movement. As one example, the method can include tracking a finger and adjusting a zoom of an image in accordance with a finger movement in at least one dimension. In another aspect, the method can include centering an image in accordance with a finger movement in at least one dimension. The method can include detecting a second touchless finger movement for taking a picture, zooming, starting a recording, or stopping a recording Another embodiment is directed to a mobile device. The mobile device can include a camera for capturing pictures, a sensing unit operatively coupled to the camera for detecting a touchless finger movement, and a processor for controlling the camera in accordance with the touchless movement. The processor can identify a first touchless finger movement for selecting a first camera control, and identify a second touchless finger movement for adjusting the camera control. As one example, the processor can identify a first touchless finger movement for zooming, and a second touchless finger movement for capturing a picture. As another example, the processor can identify a first touchless finger movement for adjusting a lighting, and a second touchless finger movement for capturing a picture. In one arrangement, the sensing unit can automatically activate when a camera mode is selected.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system.

The term "camera" can be defined as a device for capturing images or displaying captured images. The term "view" can be described as a receptive field of a camera, or a visual representation of a captured image. The term "touchless" can be defined as without physical contact. The term "absolute" can be defined as a particular location. The term "relative displacement" can be defined as a change in location.

One embodiment of the invention is directed to a method for operating a camera using motion detecting sensing. The method can include detecting a movement, and controlling the camera as a function of the movement. The method can include locating an absolute position of an object of the movement for positioning a view of the camera. The method includes producing a coordinate from the detected movement and processing the coordinate to position a view of the web camera. In another aspect, the method further includes producing a differential coordinate from the detected movement for moving the web camera with a relative displacement. The movement can be a continuous movement, an accelerated movement, a graduated movement, and a stop movement. In this manner, the user movements are translated to camera controls.

FIG. 1

Figure 1:
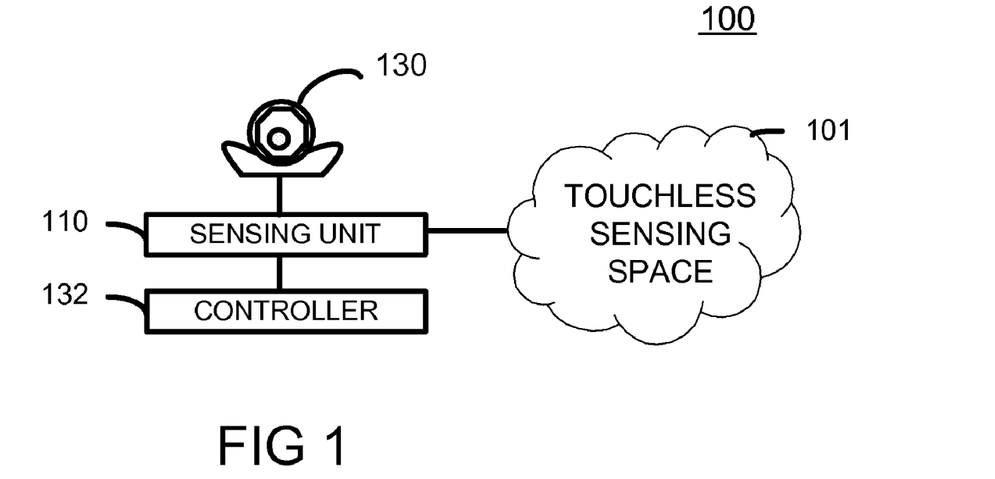
FIG. 1 is a touchless sensing unit for controlling a camera in accordance with an embodiment of the inventive arrangements.

Referring to FIG. 1, a device 100 for controlling a camera using a motion sensing device is shown. The system 100 can include a camera 130, a sensing unit 110 operatively coupled to the camera 130, and a controller 132 operatively coupled to the sensing unit 110 and the camera. Briefly, the sensing unit 110 can generate a touchless sensing space 101, and the controller 132 can detect a movement of an object within the touchless sensing space 101. The controller 132 can control the camera in accordance with the touchless finger movement. As an example, the controller 132 can position a view of the camera 130, adjust a zoom of the camera, adjust a centering of a camera view, adjusting a lighting, or adjusting any other camera controls. The sensing unit 110 and the camera 130 can communicate via a wired or wireless connection. In one arrangement the components may be integrated together on a single device. In another arrangement the components may be separate. The sensing unit 110 can support blue-tooth communication, wi-fi communication, or Radio Frequency (RF) control. The sensing unit 110 can also be wired to the camera using a USB connection, a 1394 FireWire connection, a PS/2 connection, or a Ethernet connection, but is not limited to these. The sensing unit 110 can also be positioned remotely from the web camera 130 for providing remote control or monitoring. For example, a user on a remote device can control the focus, position, and view another user's web camera.

The device 100 can be a single component such as a single-chip solution, a system-on-a-chip solution, a custom ASIC, an EPROM, an FPGA, a DSP, or microcontroller, but is not limited to these devices. The sensing device 110 can include one or more sensors that detects signals. The sensors can be ultrasonic transducers, acoustic microphones, Micro Electro Mechanical Element (MEMS) microphones, CMOS imagers, optical sensors, or any other sensors for converting a physical media to an electric signal such as a voltage or current, but is not limited to these. Briefly, the sensing device 110 can detect touchless movement of an object, such as a finger, within the touchless sensing space 101.

FIG. 2

Figure 2:
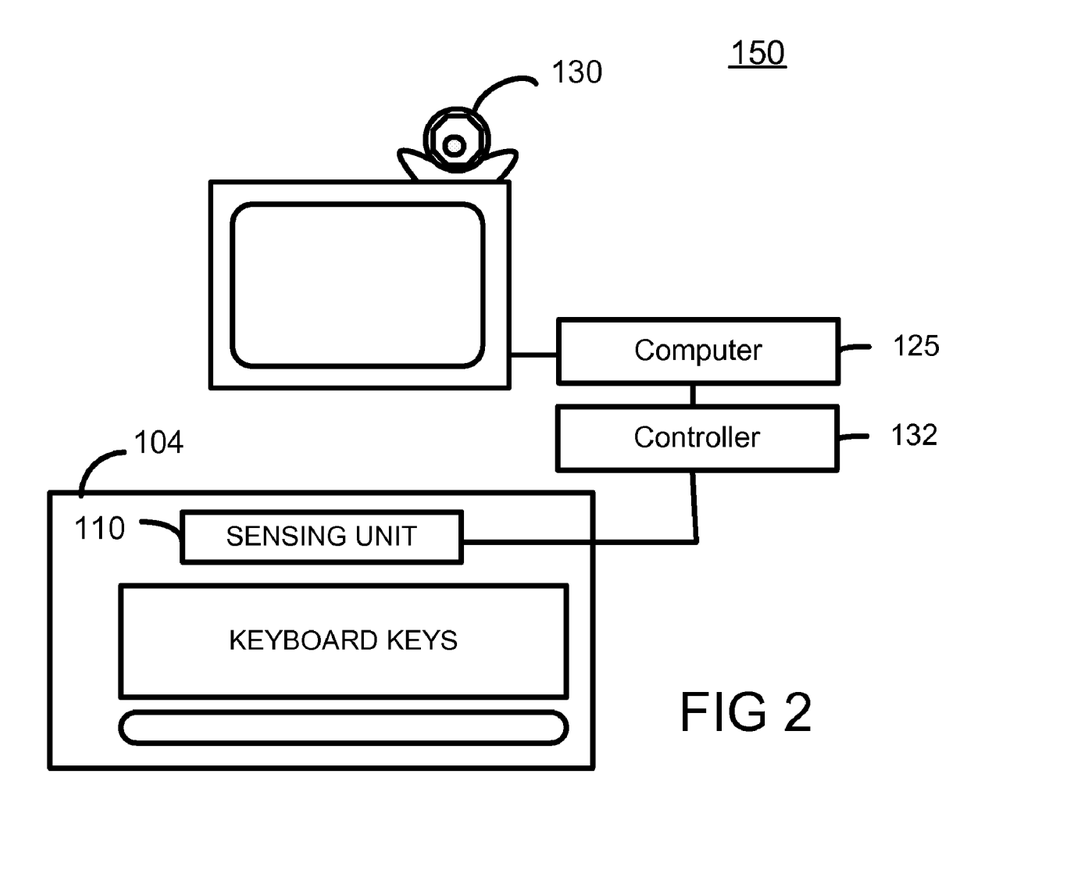
FIG. 2 is an exemplary illustration for controlling a camera with a computer in accordance with an embodiment of the inventive arrangements.

Referring to FIG. 2, one exemplary application for touchless camera control is shown. Notably, the device 100 can be employed within the context of a computer environment to provide touchless camera control. The application 150 can include a keyboard 104, a computer 125, and a monitor 122. The system 150 can include the camera 130, which may be a web camera, the sensing unit 110, and the controller 132. The sensing unit 110 can connect to the computer 125 through a USB or PS/2 connection directly to the computer 125. The sensing unit 110 can also be integrated within the keyboard 104 and communicating through a common connection with the keyboard 104 to the computer 125.

In one arrangement, the sensing unit 110 can be pointed in a direction of general typing area. For example, a user can be typing at the keyboard 104 and raise at least one finger to control the web camera 130. The sensing unit 110 can detect a solitary finger moving above the keyboard 104 and control the web camera 130 without the user moving the hands from a normal keyboard typing position. As an example, the user can use a first finger to position the camera 130, and a second finger movement to take a picture. The first finger may be on a right hand, and the second finger may be on a left hand, but is not limited to separate hands. A finger on the same hand can be use to position the camera and take the picture. The controller 132 can also differentiate between finger movements. In such regard, the controller can identify a first finger movement to perform a first control, and a second finger movement to perform a second control. The same finger can be used for the first and second finger movement.

FIG. 3

Figure 3:
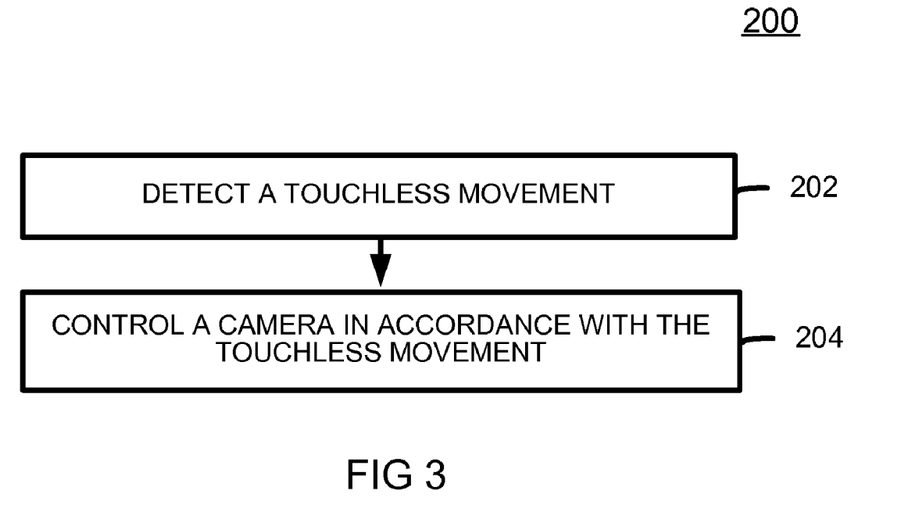
FIG. 3 is a method for touchless control of a camera in accordance with an embodiment of the inventive arrangements.

Referring to FIG. 3, a method 200 for operating a camera is shown. At step 202, a touchless movement can be detected. A touchless movement can be a movement of an object within a view of the camera, or the movement of an object outside a view of the camera. For example, referring to FIG. 2, the object may be the users' fingers over the keyboard 104. In this case, the fingers are not in view of the camera 130. Accordingly, the controller 132 controls the camera based on touchless movement that are not within the view of the camera; that is, the finger movements. For example, the user can control the camera 130 through touchless finger movements in the touchless sensing space 101 above the keyboard 104. Notably, in this arrangement, the touchless sensing space 101 does not correspond to the field of view of the camera. In another arrangement, however, the touchless sensing space 101 can correspond to the field of view of the camera. In this arrangement, the sensing device 101 can project the touchless sensing space 101 within the camera's field of view. As an example, the object may move in the camera's field of view which allows the controller to focus on the object. For instance, the controller 132 can automatically identify the object and focus on the object due to the object's movement.

In one embodiment the sensing device 110 can transmit and receive ultrasonic signals. The controller 132 can determine a location and movement of the finger using echo location. For example, a sensor in the sensing device 110 can transmit an ultrasonic signal and wait for a reflection. If an object is present it will reflect the transmitted signal. The sensing device 110 can receive the reflection signals. The controller 132 can estimate a time of flight measurement and differences in time of flight from timing measurements between the transmitted and reflection signals to determine the location of the object. The controller 132 can also estimate other properties of the received signal to estimate object attributes in addition to object displacement. The controller 132 can include additional processing logic such as thresholds, comparators, logic gates, clocks, and the like for detecting the finger's position and motion in accordance with pulse echo range detection. In practice, the controller 132 can calculate an absolute position or a relative displacement of the finger based on a plurality of reflections by solving a series of geometric equations.

At step 204, a camera can be controlled in accordance with the touchless movement. The camera can include one or more user controls. Referring back to FIG. 1, the controller 132 can adjust a zoom, pan, focus, aperture, balance, color, calibration, or tilt of the camera in accordance with the touchless movement. For example, referring to FIG. 2, each location of the finger in the touchless sensing space 101 can correspond to a control. For instance, controls can be arranged in a horizontal virtual layout, wherein the user can position the finger over a virtual control. The virtual controls can be arranged horizontally such that a user can move the finger left or right to select a control. Upon selecting the control in the touchless sensing space 101, the user can then change a value of the control by raising the finger up or down. For example, the user can increase a control by raising the finger, and decrease the control by lowering the finger.

FIG. 4

Figure 4:
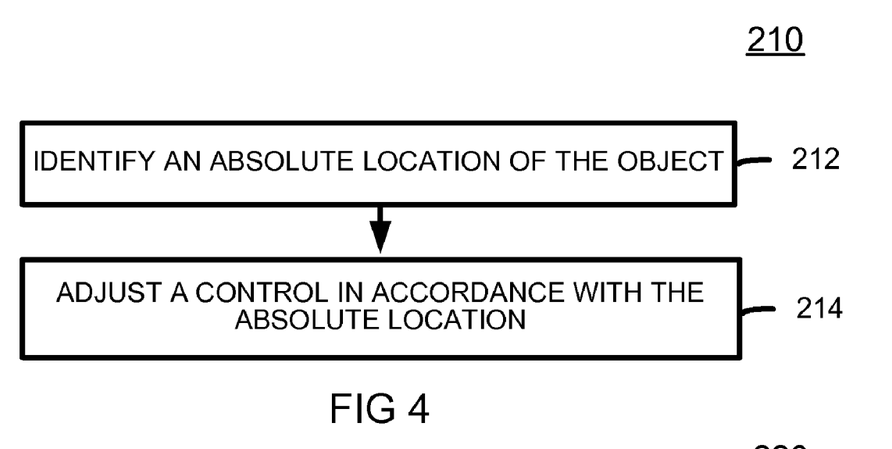
FIG. 4 is a method for tracking touchless movement based on absolute location in accordance with an embodiment of the inventive arrangements.

Referring to FIG. 4, at step 212, the controller can identify an absolute location of the object. For example, the virtual controls arranged in the horizontal layout of the previous example are associated with an absolute position. That is, the sensing device 110 associates a virtual control with an absolute location of the finger in the touchless sensing space 101. At step 214, the controller 132 can adjust a control in accordance with the absolute location. For example, after the user positions the finger over a virtual control, the user can adjust the control by moving the finger up and down. The adjustment may or may not be based on absolute locations.

FIG. 5

Figure 5:
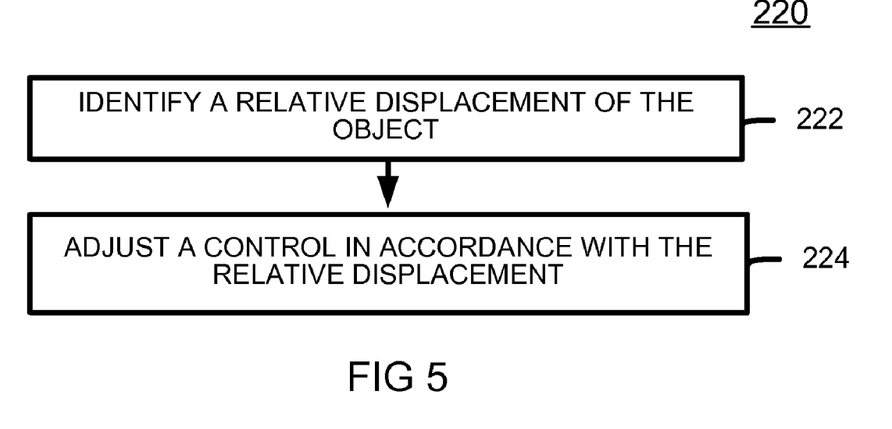
FIG. 5 is another method for tracking touchless movement based on relative displacement in accordance with an embodiment of the inventive arrangements.

Referring to FIG. 5, at step 222, the controller 132 can identify a relative displacement of the object. A relative displacement can identify a distance of the object movement. The distance can be associated with a change in value of a control. For example, the user can raise a finger to increase an value of a control. The change in value can correspond to the relative displacement of the finger in the touchless sensing space 101. At step 224, a control can be adjusted in accordance with the relative displacement. By using relative displacement, the user does not need to remain within an absolute region. That is, the user's finger can deviate during movement without adverse effect on adjusting the controls.

FIG. 6

Figure 6:
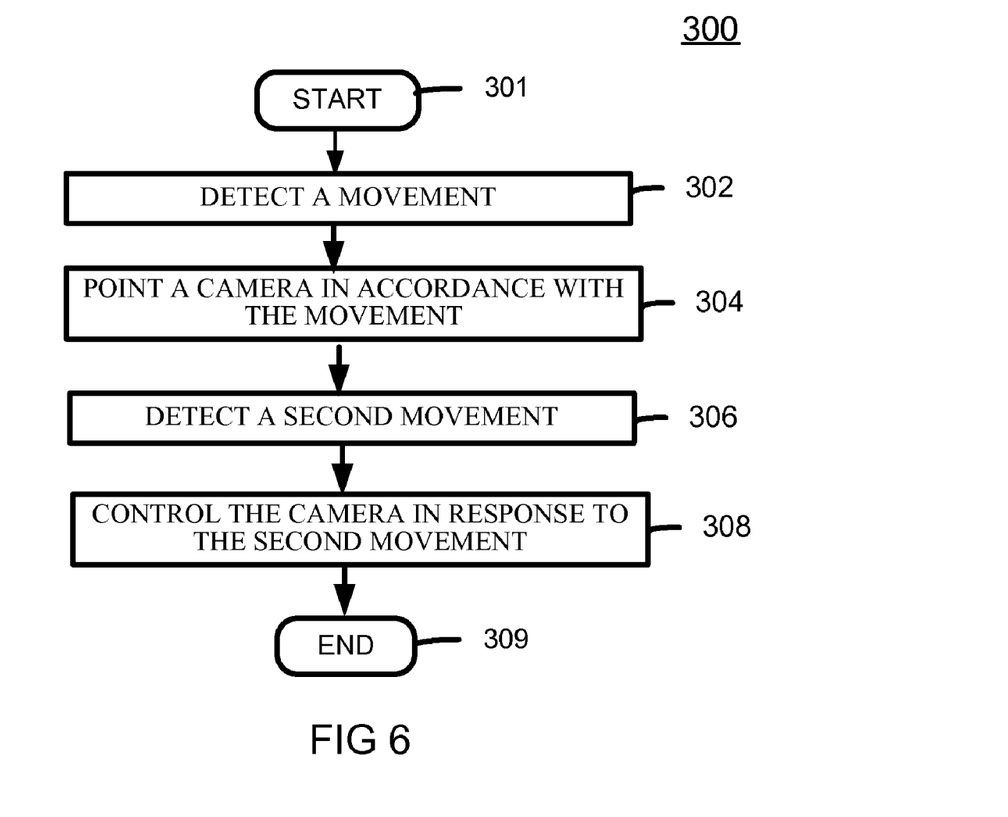
FIG. 6 is an example method for pointing a camera in accordance with an embodiment of the inventive arrangements.

Referring to FIG. 6, a method 300 controlling a web camera using motion detection sensing is shown. When describing the method 300, reference will be made to FIG. 2, although it must be noted that the method 300 can be practiced in any other suitable system or device. Moreover, the steps of the method 300 are not limited to the particular order in which they are presented in FIG. 6. The inventive method can also have a greater number of steps or a fewer number of steps than those shown in FIG. 6.

At step 301, the method can start. At step 302, a movement can be detected. For example, referring to FIG. 2, a user can type at the keyboard 110 and raise a finger to assume control of the web camera 130. The sensing unit 110 detects a finger movement and moves the web camera in accordance with the finger movement. The sensing unit 110 employs motion detection algorithms to track particular finger movement behaviors.

At step 304, a web camera can be pointed as a function of the detected movement. For example, referring to FIG. 2, when the user is normally typing, all the fingers can be moving. The sensing unit 110 detects multiple movements and determines that control of the web camera is not requested. When the user raises a solitary finger while keeping the remaining fingers relatively still, the sensing unit 110 detects a continuous movement that is more cohesive over time, i.e. there is only one motion detected which is slowly time varying since it is only one finger moving as compared to many fingers. The motion sensing device can be an ultrasonic sensing system, an infrared detector, a phased array, an acoustic sensor array, or an optical camera. Accordingly, the sensing unit can itself be the web camera unit. For example, the web camera can identify finger motion and control itself based on the finger motion.

At step 306, a second movement can be detected. For example, referring to FIG. 2, the second movement can be initiated by the same finger on a first hand or on another finger of the other hand. For example, the sensing unit 110 detects a second movement and the controller 130 determines that the second movement signifies an action command. For example, the second movement can request a mouse behavior action such as a single click, double click, or hold behavior. The user may want to issue a mouse behavior using the second finger while controlling the web camera using the first finger. For example, the user may want to snap a picture when the web camera is moved to a favorable location. If the user uses the same finger used for controlling the web camera, the sensing unit 110 detects a cohesive movement, and decides that the movement is to position the camera. However, if the user moves a second finger, the sensing unit 110 detects a non-cohesive movement. A non-cohesive movement is that movement which is not perceived as continuous by the sensing unit 110.

At step 308, the web camera can be controlled in response to the second movement. For example, referring to FIG. 3, the sensing unit 110 detects cohesive movement when a single finger is moved because the single finger moves continuously within it's finger space. However, movement of a second finger during a movement of a first finger can produce contentions at the sensing unit 110. The sensing unit 110 no longer detects a cohesive movement and determines that a mouse action is requested. For example, the second movement stops and starts a tracking behavior to release or establish control of the web camera. By directing a second movement using a second finger, the sensing unit 110 determines a warranted action. Also, the second movement can signify a request for the user to perform a web camera control action such as taking a picture, zooming in, starting a recording, or terminating a recording.

FIG. 7

Figure 7:
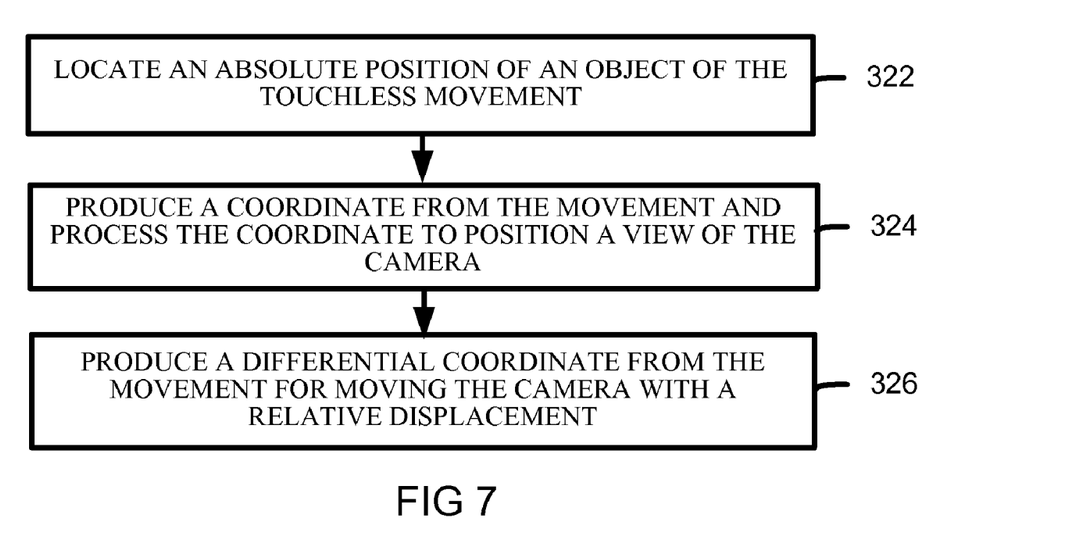
FIG. 7 is a method for using absolute and relative displacement for pointing a camera in accordance with an embodiment of the inventive arrangements.

Referring to FIG. 7, additional method steps for the method 300 are shown. In particular, the method steps 322-324 correspond to method step 302 for detecting a movement. The method step 304 is not limited to method steps 322 to 326 and any other suitable steps for realizing the steps are considered. At step 322 an absolute location of an object producing the movement can be located and the absolute position can be used to position a view of the web camera. For example, referring to FIG. 2, the sensing unit 110 determines an absolute position of the finger residing above the keyboard. The sensing unit 110 estimates an absolute distance of the finger from the sensing device 110. For example, when the ultrasonic sensing unit is a series of ultrasonic transducers, a pulse echo detection is employed to measure a range value. The ultrasonic emitters transmit a pulse and a detector determines an arrival time of a reflected signal. The arrival time reveals a time of flight measurement which can be used to identify a finger position within a two dimensional or three dimensional space. When the sensing unit is a phased array or microphone array, beam forming techniques are employed to estimate amplitude and phase differences at the different array elements. A processor can estimate differences in the amplitudes and phases for identifying a finger position.

At step 324, a coordinate from the movement can be produced and the web camera can be positioned in view of the coordinate. For example, referring to FIG. 2, the sensing unit 110 determines a location of the finger to produce a coordinate representing the position of the finger in the finger space. The finger space can be that region which the solitary finger moves and which establishes its own principal axes. For example, the finger space can be a two-dimensional x-y coordinate system, or a three-dimensional coordinate system with x, y, and z coordinates. The sensing unit 110 sends the coordinate to the controller 132 which interprets the coordinate and maps the coordinate to a pointing direction for the web camera 130. The controller 132 maps absolute locations in the finger space to absolute locations within the camera space. For example, the camera can be configured to capture images within a certain field. The user can set the field or the camera can set the field automatically. The boundaries of the field determine the camera space which the controller 130 is aware. In the preferred embodiment, the controller provides a one-to-one mapping of the finger space to the camera space. Accordingly, a particular location of the finger above the keyboard is mapped to a unique camera position. The mapping can also be non-linear. At step 326, a differential cursor coordinate can be produced from the detection of the movement for moving the cursor with a relative displacement. Referring to FIG. 2, the sensing unit 110 can detect relative displacements of finger motion. For example, instead of using an absolute location of the finger to determine a mapping for pointing the web camera, a relative displacement of finger movement can be used. The sensing unit 110 is capable of storing finger movement information over time. The sensing unit 110, sends historical captured information regarding finger movement to the controller 130. The controller 130 determines differences in absolute positions for determining relative displacements. For example, the controller 130 applies a first order difference function for determining a rate of change corresponding to a change of range. The controller 130 can employ phased array techniques using amplitude and phase differences for determining relative displacements. The controller 130 moves the web camera in incremental steps based on the relative change, or finger displacement. This is different from the one-to-one mapping of absolute positions which moved the camera to a position based on the actual finger location. By using differential detection, the controller 130 releases the one-to-one mapping constraint. This gives more flexibility to the user for controlling the camera, without having to be in a defined finger space area. For example, with relative displacement differences, the controller 130 can move the camera in incremental steps regardless of where the finger may be so long as the finger is within motion detection range of the sensing unit 110. This can make the system 100 more robust to unintentional hand displacements along the keyboard 100.

FIG. 8

Figure 8:
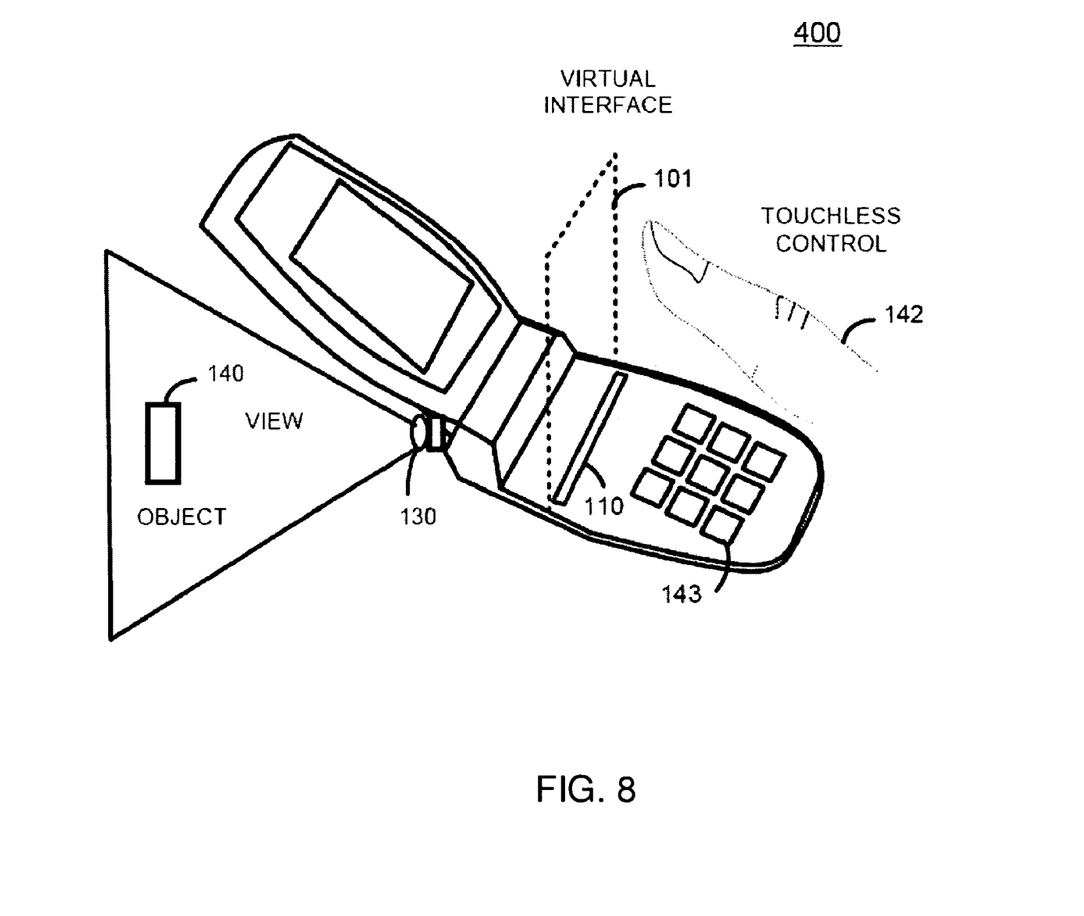
FIG. 8 is an exemplary illustration for controlling a camera with a mobile device in accordance with an embodiment of the inventive arrangements.

Referring to FIG. 8, another exemplary application for touchless camera control using the device 100 of FIG. 1 is shown. The device 100 can be employed within the context of a mobile device 400. In one arrangement, the mobile device 400 can place the sensing unit 110 above a keypad 143 of the mobile device 400. The sensing unit 110 can create the touchless sensing space over the keypad 143 and in front of a display. The touchless sensing space is not limited to the arrangement shown. For example, the touchless sensing space 101 can be above the keypad, above the display, or above another portion of the mobile device 400. The touchless sensing space 101 provides a virtual interface to the mobile device. A user can position a finger 142 or a thumb within the touchless sensing space 101 to handle one or more controls of the mobile device and take a picture of an object 140 in the view of the camera 130.

FIG. 9

Figure 9:
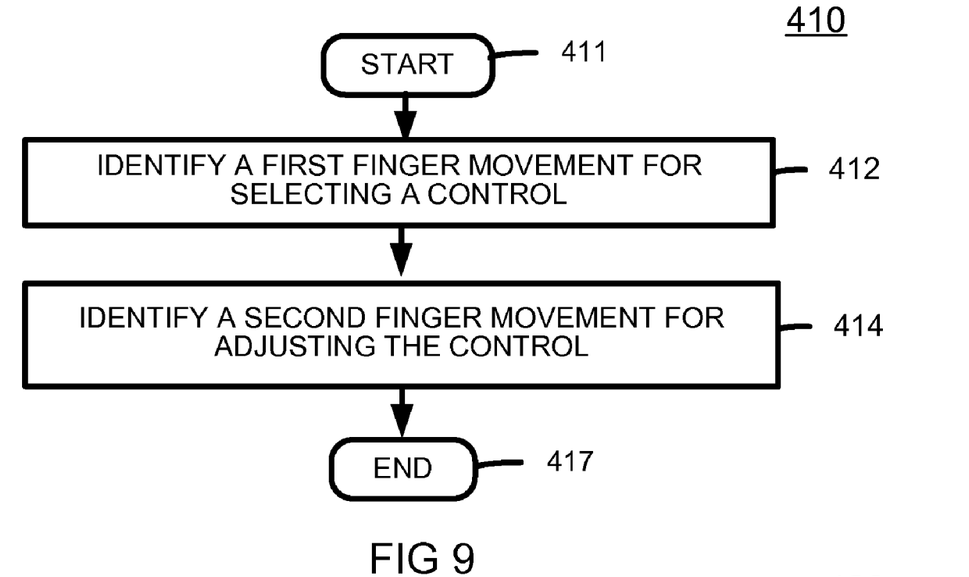
FIG. 9 is a method for touch less finger control of a camera in accordance with an embodiment of the inventive arrangements.

Referring to FIG. 9, a method 410 for operating a camera using touchless control is shown. When describing the method 410, reference will be made to FIG. 1-3, although it must be noted that the method 410 can be practiced in any other suitable system or device. Moreover, the steps of the method 410 are not limited to the particular order in which they are presented in FIG. 9. The inventive method can also have a greater number of steps or a fewer number of steps than those shown in FIG. 9.

At step 411, the method 410 can start. The method 410 can start in a state wherein a user has entered a camera mode. For example, referring back to FIG. 8, the user may press a camera key to capture an image. Upon pressing the camera key, the sensing device 110 can activate touchless control. The user can then place the finger in the touchless sensing space 101 to handle one or more controls of the camera. As one example, the user can hold the mobile device 400 in one hand, and use a finger of a second hand to control the camera via touchless sensing.

At step 412, a first finger movement for selecting a control can be identified. The first finger movement can correspond to the user selecting a control. For example, referring back to FIG. 8, the user can move the finger up and down to scroll through a menu list of controls. A control can be a zoom, pan, focus, aperture, balance, color, calibration, or tilt. The user can stop the up and down finger movement to pause at a control. For example, the user can pause the finger when a balance control is selected, or visually presented on a display. Briefly, referring back to FIG. 1, the controller 132 can identify and differentiate between finger movements. For example, the controller 132 can track the first finger movement and keep a history of the finger locations. The controller can determine when the finger has moved repeatedly at a location or away from a location. The controller 132 can also identify a direction of the finger movement. Accordingly, the controller can differentiate between up, down, left, right, forward, and backward motion.

At step 414, a second finger movement for adjusting a control can be identified. A second finger movement is distinguishable from a first finger movement. For example a first finger movement may be an up and down movement, such as the example of scrolling to the balance control in step 412, and the second finger movement may be a left and right finger movement for adjusting the balance control. For example, referring back to FIG. 8, after the pause of the finger, the user can perform a left to right finger movement to adjust a balance control. The user can move the finger to the right to increase the control, and to the left to decrease the control. In another arrangement, the user can perform a back and forth sweep to select the control, and then resume an up and down finger movement to adjust the control. Notably, referring back to FIG. 1, the controller 132 can differentiate between different types of finger movements. At step 417, the method 400 can end.

FIG. 10

Figure 10:
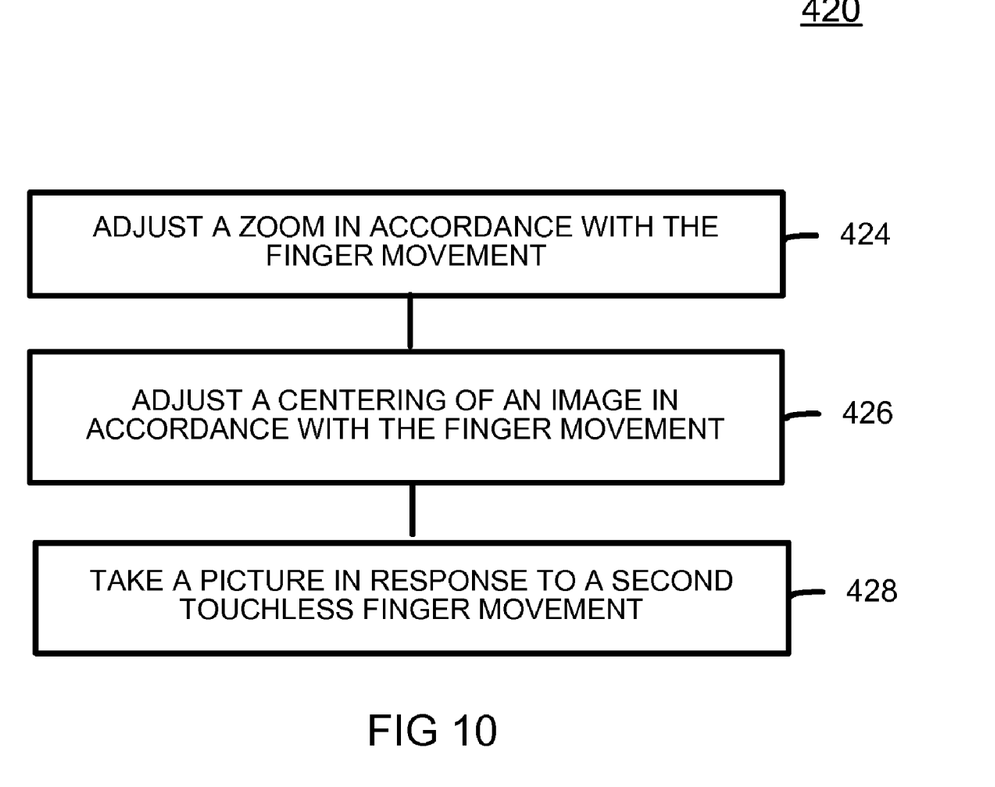
FIG. 10 is an example application for touchless finger control of a camera in accordance with an embodiment of the inventive arrangements.
Figure 11:
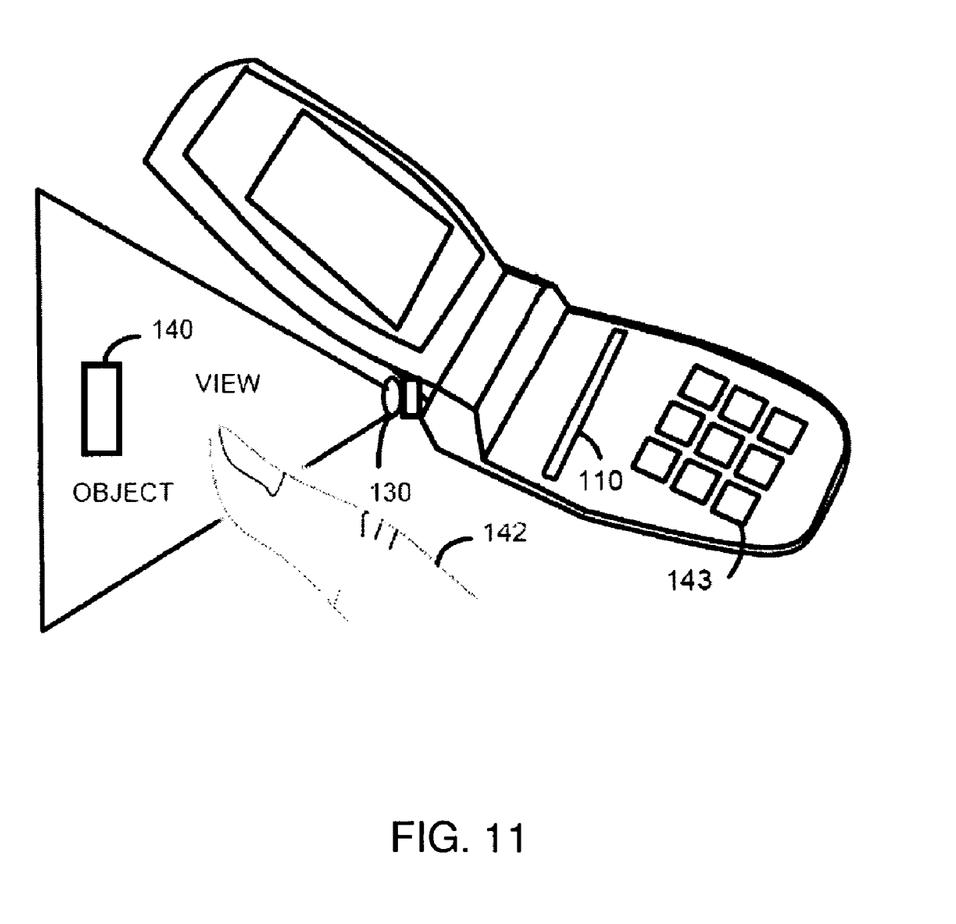
FIG. 11 is an exemplary illustration for controlling a camera with a mobile device in accordance with another embodiment of the inventive arrangements.

Referring to FIG. 10, an example application 420 for touchless control of a camera is shown. The steps of the method 420 are not limited to the particular order in which they are presented in FIG. 10. The inventive method can also have a greater number of steps or a fewer number of steps than those shown in FIG. 10.

The example application is directed to touchless control of a camera using the mobile device shown in FIG. 8. Briefly, a user can adjust one or more controls of the mobile device to take a picture with the camera 130 of the mobile device 400. For example, a user may press an image capture button on the mobile device 400 to take a picture. Upon pressing the image capture button, the mobile device 400 activates touchless sensing. The user can select a control by performing a first finger movement, such as an up and down movement. A window can be displayed that presents a list of controls. The user can scroll through the list by moving the finger up and down in the sensing space 101. The user can select a control in the list by pausing the finger at the control entry, or by issuing a back and forth finger movement.

Upon selecting the control, the user can adjust the control by a second finger movement. The second finger movement may be forward and backward movement. For example, at step 424, the user can adjust a zoom by moving the finger forward and backward in the touchless sensing space 101. As another example, the user can select a centering control, and adjust the centering by moving the finger up, down, left, or right. For example, referring to FIG. 8, a centering of the object 140 can be increased or decreased in accordance with the finger movement. In this case, moving to the right centers the image to the right, and moving to the left centers the image to the left. Similarly, other controls can be adjusted through touchless finger movements. After the controls have been adjusted, at step 428, the user can perform another touchless finger movement to take a picture. For example, the user can abruptly move the finger out of the touchless sensing space 101 to take a picture. Briefly, referring back to FIG. 1, the controller 132 can differentiate between accelerated movement. Accordingly, the controller 132 can recognize that an accelerated finger movement corresponds with an action to take a picture.

Notably, the controller 132 can identify a continuous movement, an accelerated movement, a graduated movement, and a stop movement for controlling the camera. As an example, the movement of the camera can adjust in accordance with a speed of the finger movement. The user can select which touchless finger movements correspond to controls. For example, a user may choose up and down finger movements for scrolling a list, back and forth movements for adjusting a control, and accelerated finger movements for taking a picture. Accordingly, a list of controls and associated touchless finger movements can be stored in a table and accessed by the controller 132. The controller 132 can refer to the table when differentiating between a first finger movement for selecting a control (412) and a second finger movement for adjusting a control (414).

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A device for operating a camera, comprising:
   a sensing unit for
      projecting a touchless sensing space in a field of view of the camera,
      displaying or projecting an image within the same field of view, and
      detecting a touchless movement directed to a displayed object in the image; and
   a controller cooperatively coupled to the sensing unit for
      identifying the displayed object, and
      controlling a camera representation of the displayed object as a function of the touchless movement.

2. The device of claim 1, wherein controller tracks a finger movement and points the field of view of the camera in a direction of the finger movement.

3. The device of claim 1, wherein the device is a mobile phone mobile communication device or a portable music player that projects the images on a surface.

4. The device of claim 1, wherein the controller adjusts at least one of a zoom, pan, focus, aperture, balance, color, calibration, or tilt of the object in accordance with the touchless movement.

5. The device of claim 1, wherein the sensing unit creates a touchless sensing field above a keyboard typing area, such that a finger moving in the touchless sensing field controls the object.

6. The device of claim 1, wherein the sensing device comprises at least one of an ultrasonic device, a MEMS microphone, an acoustic microphone, an optical device, an infrared device, a laser device, or a charge coupled device (CCD).

7. A method for operating a camera, comprising the steps of:
   projecting a touchless sensing space in a field of view of the camera;
   displaying or projecting an image to produce a projected image;
   detecting a touchless movement that is directed to a displayed object in the projected image; and
   controlling the object in accordance with the touchless movement.

8. The method of claim 7, further comprising:
   identifying a location of the object in the image from the touchless movement; and
   adjusting a control of the camera in accordance with the absolute location,
   wherein the projected image is separate from the touchless sensing space.

9. The method of claim 7, further comprising:
   identifying a location of the object in the image from the touchless movement; and
   adjusting a control of the camera in accordance with the relative displacement,
   wherein the projected image is in the touchless sensing space.

10. The method of claim 7, wherein the control is a zoom, pan, focus, aperture, balance, color, calibration, or tilt.

11. The method of claim 7, wherein the control is adjusted in accordance with a range of the touchless movement.

12. The method of claim 7, wherein the touchless movement is at least one of a continuous movement, an accelerated movement, a graduated movement, or a stop movement.

13. The method of claim 7, wherein detecting a touchless movement includes tracking a finger and adjusting a zoom of an image in accordance with a finger movement in at least one dimension.

14. The method of claim 7, wherein detecting a touchless movement includes tracking a finger and adjusting a centering of an image in accordance with a finger movement in at least one dimension.

15. The method of claim 7, wherein a second touchless movement performs one of taking a picture, zooming, starting a recording, or stopping a recording.

16. A mobile phone, comprising
   a camera for capturing pictures and projecting images;
   a sensing unit operatively coupled to the camera for projecting a touchless sensing space within a field of view of the camera and detecting a touchless finger movement that identifies an object in a picture or a projected image within the field of view; and
   a processor for controlling the object in the field of view of the camera in accordance with the touchless finger movement.

17. The mobile phone of claim 16, wherein the processor identifies a first touchless finger movement for selecting a first camera control, and identifies a second touchless finger movement for adjusting the camera control.

18. The mobile phone of claim 16, wherein the processor identifies a first touchless finger movement for zooming the object.

19. The mobile phone of claim 16, wherein the sensing unit automatically activates when a camera mode is selected.

20. The mobile phone of claim 16, wherein the processor focuses the camera on the object of the touchless movement.

* * * * *